US010239368B2

(12) United States Patent
Benedict et al.

(10) Patent No.: US 10,239,368 B2
(45) Date of Patent: Mar. 26, 2019

(54) AIR MAINTENANCE TIRE AND VALVE ASSEMBLY (71) Applicant: The Goodyear Tire & Rubber Company, Akron, OH (US)

(72) Inventors: Robert Leon Benedict, Tallmadge, OH (US); Robert Allen Losey, Kent, OH (US); Thulasiram Gobinath, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 538 days.

(21) Appl. No.: 14/567,446

(22) Filed: Dec. 11, 2014

(65) Prior Publication Data

US 2016/0167457 A1    Jun. 16, 2016

(51) Int. Cl.
*B60C 23/12* (2006.01)
*B60C 23/10* (2006.01)
*B60C 23/00* (2006.01)

(52) U.S. Cl.
CPC .......... *B60C 23/12* (2013.01); *B60C 23/001* (2013.01); *B60C 23/10* (2013.01)

(58) Field of Classification Search
CPC ....... B60C 23/10; B60C 23/12; B60C 23/001; B60C 23/004
USPC .......................................... 152/419, 423–426
See application file for complete search history.

(56) References Cited

U.S. PATENT DOCUMENTS

| 8,042,586 | B2 * | 10/2011 | Losey ............... B60C 23/12 152/415 |
| 8,826,955 | B2 * | 9/2014 | Delgado ............ B60C 23/12 152/419 |
| 8,944,126 | B2 * | 2/2015 | Frantzen ........... B60C 19/00 152/424 |
| 8,960,249 | B2 * | 2/2015 | Lin .................... B60C 23/12 152/419 |
| 2011/0146868 | A1 | 6/2011 | Losey et al. |
| 2013/0005879 | A1 | 1/2013 | Nakano |
| 2013/0008579 | A1 | 1/2013 | Delgado |
| 2015/0306924 | A1 * | 10/2015 | Benedict ............ B60C 23/12 152/426 |

OTHER PUBLICATIONS

European Search Report dated Mar. 31, 2016 for Application Serial No. EP15197289.

* cited by examiner

*Primary Examiner* — Jason R Bellinger
(74) *Attorney, Agent, or Firm* — June E. Rickey (57) ABSTRACT A self-inflating tire assembly includes an air tube mounted within a tire sidewall groove. The air tube is in contacting engagement with opposite angled groove surfaces surrounding the air tube. A segment of the air tube is flattened from an expanded diameter to a flat diameter by bending and compression of the groove in a rolling tire footprint to force air evacuated from the flattened segment along a tube air passageway. A tube is positioned within the groove, wherein the tube has a circular cross-sectional shape and an outside diameter D, and the groove does not have a circular cross-sectional shape, wherein said groove has a width W and a length L, wherein D is greater than W.

9 Claims, 7 Drawing Sheets

AIR MAINTENANCE TIRE AND VALVE ASSEMBLY

STATEMENT OF FEDERAL FUNDING

The invention was made with government support under DE-EE0005447 awarded by the Department of Energy. The government has certain rights in the invention.

FIELD OF THE INVENTION

The invention relates generally to air maintenance tires and, more specifically, to a tire assembly incorporating an air pumping mechanism into a tire for maintaining tire air pressure.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

According to an aspect of the invention, a self-inflating tire assembly includes a rim having a tire mounting surface extending between first and second rim flanges; a tire mounted to the rim tire mounting surface, the tire having a tire cavity, and first and second sidewalls extending respectively from first and second tire bead regions to a tire tread region. A sidewall groove is positioned within a compression zone of the tire, and an air tube is positioned within the sidewall groove in contacting engagement with opposite groove surfaces at least partially surrounding the air tube. The sidewall groove operatively bends within the compression side of the bending region responsive to a bending strain within the rolling tire footprint to compress the air tube from an expanded diameter to a flat diameter adjacent the rolling tire footprint, whereby forcing evacuated air from a flattened air tube segment along the air passageway.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
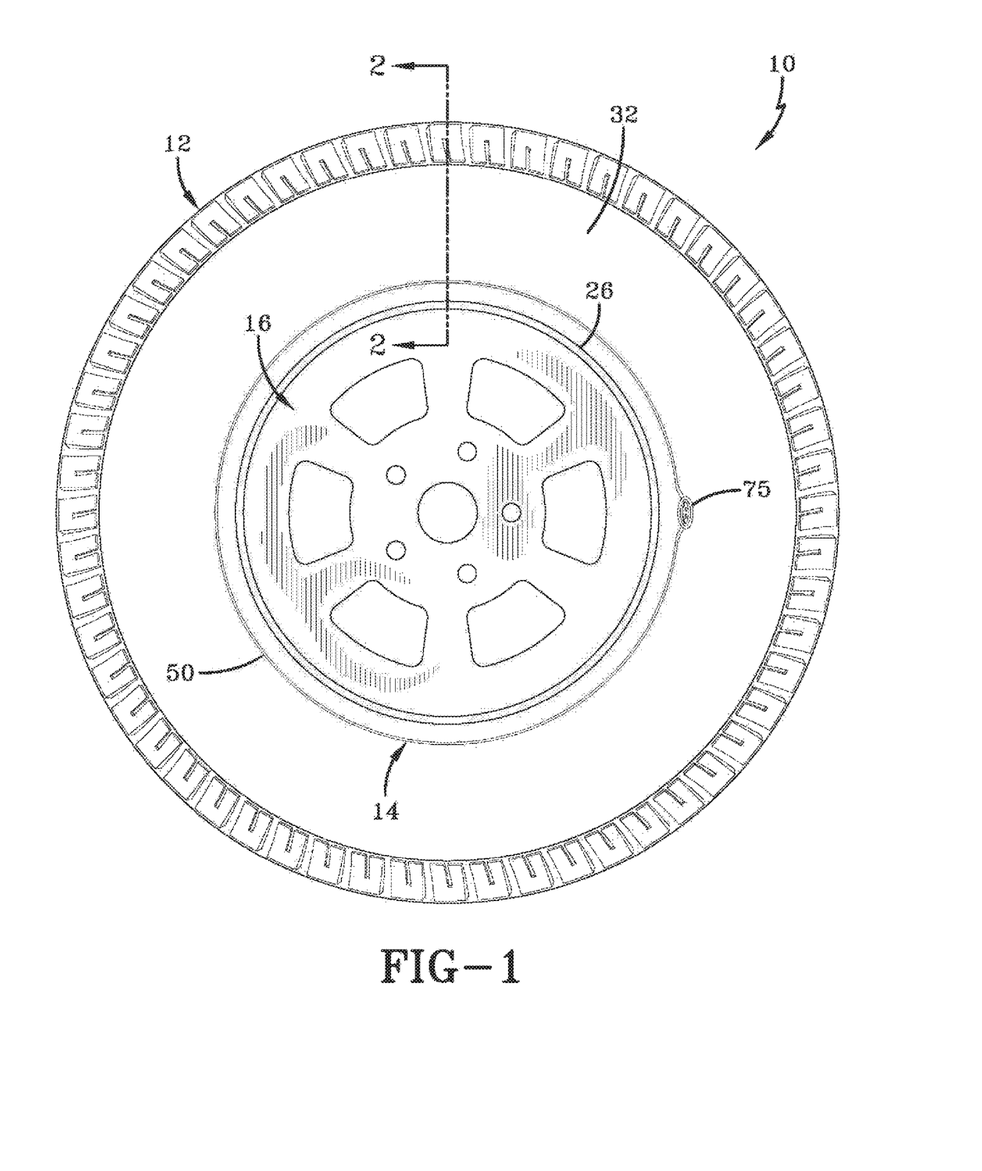
FIG. 1 is a front view of tire, rim and pump assembly.
Figure 2:
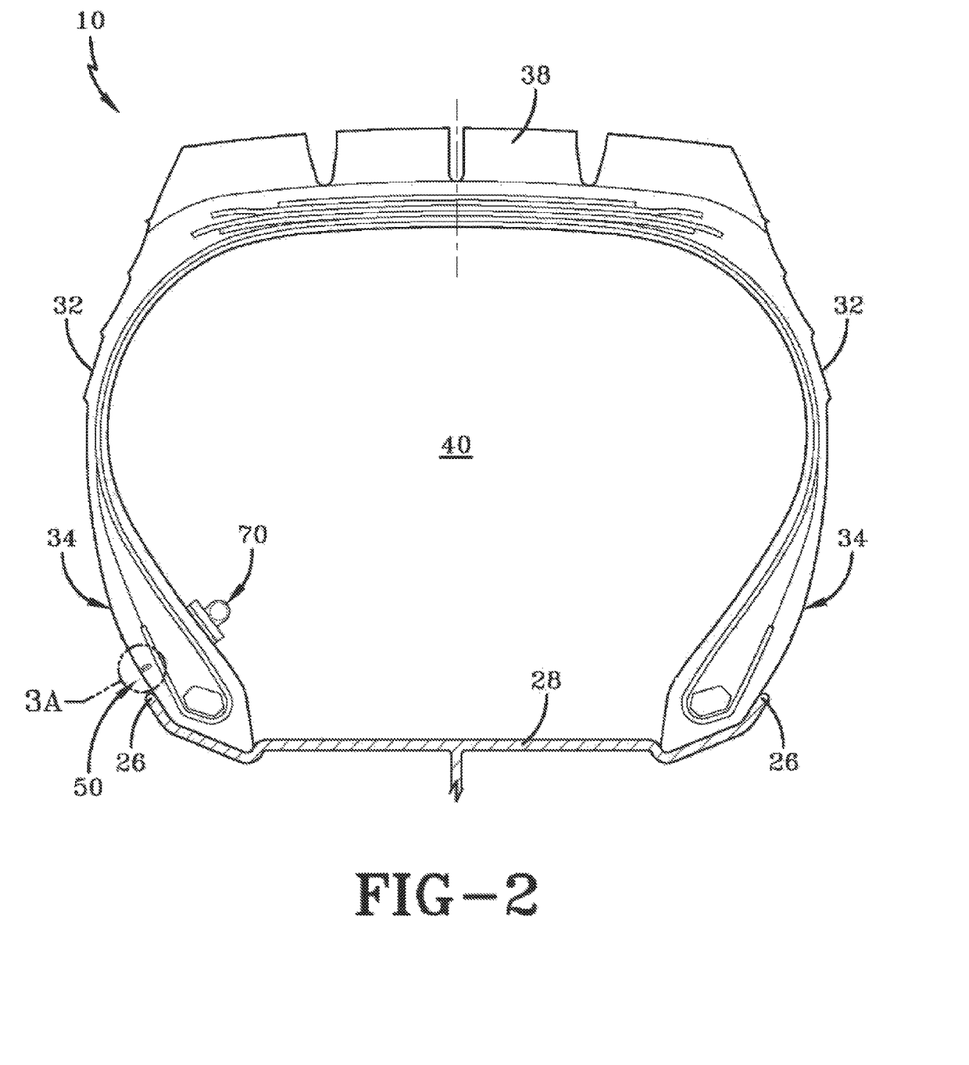
FIG. 2 is a cross-sectional view of the tire of FIG. 1.

Referring to FIGS. 1 and 2, a tire assembly 10 includes a tire 12, a peristaltic pump assembly 14, and a tire wheel 16. The tire mounts in conventional fashion to the wheel 16. The wheel 16 has a rim 28 with rim mounting flanges 26. The tire is of conventional construction, having a pair of sidewalls 32 extending from opposite bead areas 34 to a crown or tire read region 38. The tire 12 and wheel 16 enclose a tire cavity 40.

As shown in FIGS. 1, 2 and 3, the pump assembly 14 includes an air tube 50 mounted in a passageway 60. The tube 50 is formed of a resilient, flexible material such as plastic or rubber compounds that are capable of withstanding repeated deformation cycles. So constructed, the tube may deform within a tire into a flattened condition subject to external force and, upon removal of such force, return to an original sectional configuration. In the embodiment shown, the cross-section of the tube 50 in an unstressed state is generally circular with an inner round hole 52 formed by tube wall 54. The tube is of a diameter sufficient to operatively pass a requisite volume of air sufficient for the purpose of pumping air into the tire cavity 40 to maintain the tire 12 at a preferred inflation pressure. While the air tube 50 shown in this embodiment is annular for a 360 degree pump, the air tube need not be annular and may have any sufficient length for example, a 180 degree pump.

As shown in FIGS. 1 and 2, the peristaltic pump assembly 14 may further include a regulator device 70 and an air intake and filter assembly 75. The regulator device 70 functions to prevent air from entering the peristaltic pump through the air intake and filter assembly 75 if the tire air pressure in cavity 40 of the tire is greater than a selectable set point pressure. If the tire cavity pressure is below the set point pressure, the regulator 70 opens an air passage connected to the pump inlet of the peristaltic pump to allow outside air to flow into the peristaltic pump. The regulator may be as described in U.S. patent application No. 61/931,916 filed on Jan. 27, 2014, and which is hereby incorporated by reference.

Figure 4A:
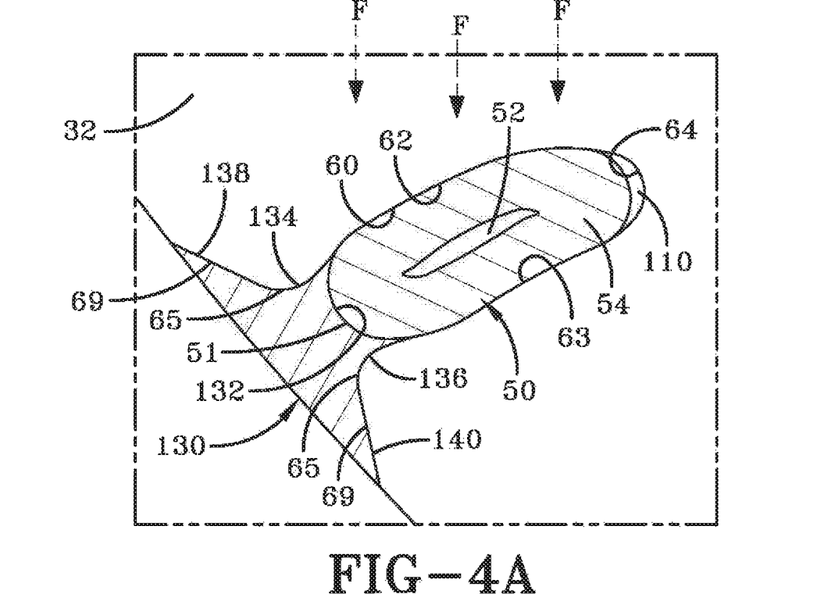
FIG. 4A illustrates a close up cross-sectional view of the pump tube in the pump sidewall passageway under load and in the open position.
Figure 4B:
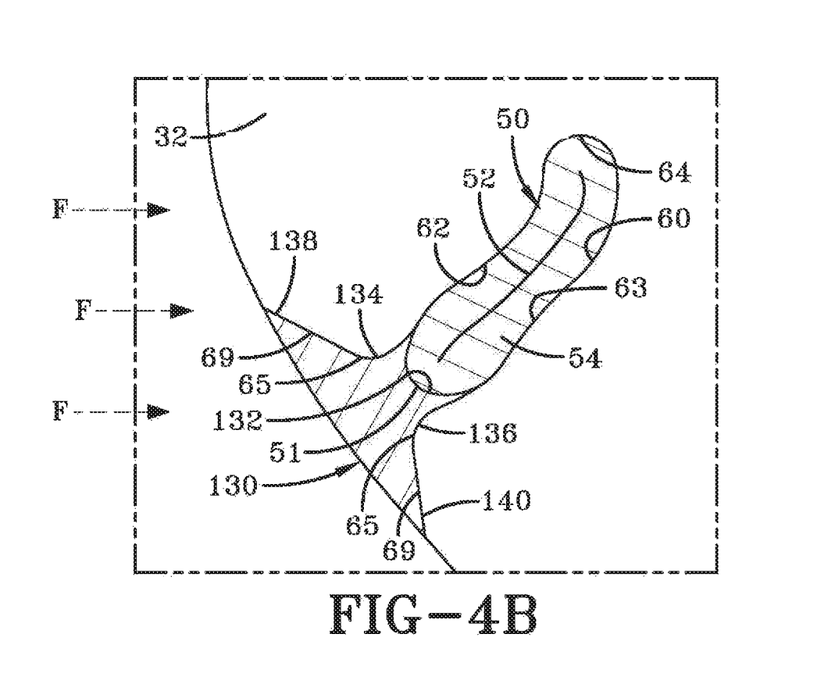
FIG. 4B illustrates a close up cross-sectional view of the pump tube in the pump sidewall passageway under load and in the closed position.

As the tire rotates, the sidewall of the tire undergoes compression as it enters the tire footprint. A compressive force F is directed into the tire from the footprint and acts to flatten a portion of the air tube passageway as shown in FIG. 4B. As the tire continues to rotate, the pump tube will be sequentially flattened or squeezed opposite the tire footprint in a segment by segment manner in a direction opposite to the direction of tire rotation. The sequential flattening of the tube passageway 50 segment by segment causes evacuated air from the flattened segments to be pumped to the outlet, into the regulator device and then into the tire cavity 40. In addition, as the tire rotates, the flattened tube segments are refilled with air from the air intake filter assembly 75 until the regulator shuts off flow to the pump when the set pressure is reached.

A preferred location for the air tube assembly 14 is as shown in FIG. 2. The air tube assembly 14 is preferably mounted in an area of the tire that undergoes bending strain. Utilizing the bending strain within a bending region of a sidewall avoids the need to compress the air tube by pinching the air tube against a relatively hard barrier such as the tire assembly rim. Potential damage to the air tube from contact with the rim is thus avoided and the structural integrity of the air tube is preserved throughout the life cycle of the tire. The tube 50 is located within a groove 60. The groove 60 is preferably located in the lower sidewall 32 of the tire 12, and more preferably, in the lower sidewall area radially outward of the upper rim flange when mounted on a wheel, as shown in FIG. 2, where bending deformation of the tire helps to achieve tube pinching.

After the tube 50 is inserted into the groove 60, a coverstrip 130 is inserted into the groove inlet to secure the tube inside the tire. The coverstrip 130 has a circular recessed face 132 that is positioned against the curved outer surface 51 of the tube 50. The coverstrip 130 has two opposed neck portions 134,136 that are received against the groove neck 65. The coverstrip 130 has outer end portions 138,140 that are mounted in the beveled portion 69 of the groove 60. FIG. 3D illustrates the tube and groove in the assembled position when the tire is in an unloaded state. When the tube is mounted into the groove, the tube cross-sectional shape is generally elliptical. FIG. 4A illustrates the groove and tube assembly when the tire is rotating under load, showing the tube in the open position. FIG. 4B illustrates when the groove and tube assembly has rotated into the footprint area, so that the tire sidewall 32 is under compression, and the tube 50 is in the closed position.

Figure 3A:
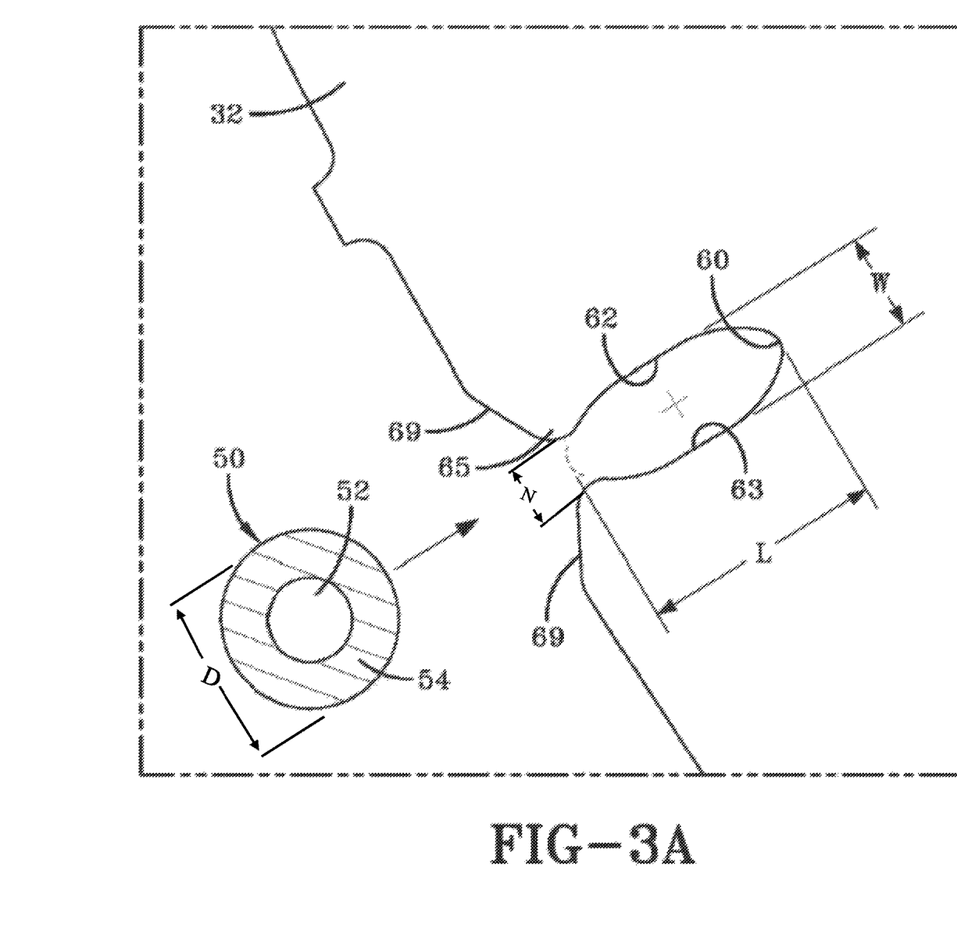
FIG. 3A is an enlarged fragmentary view of the sidewall passageway shown in FIG. 2.
Figure 3B:
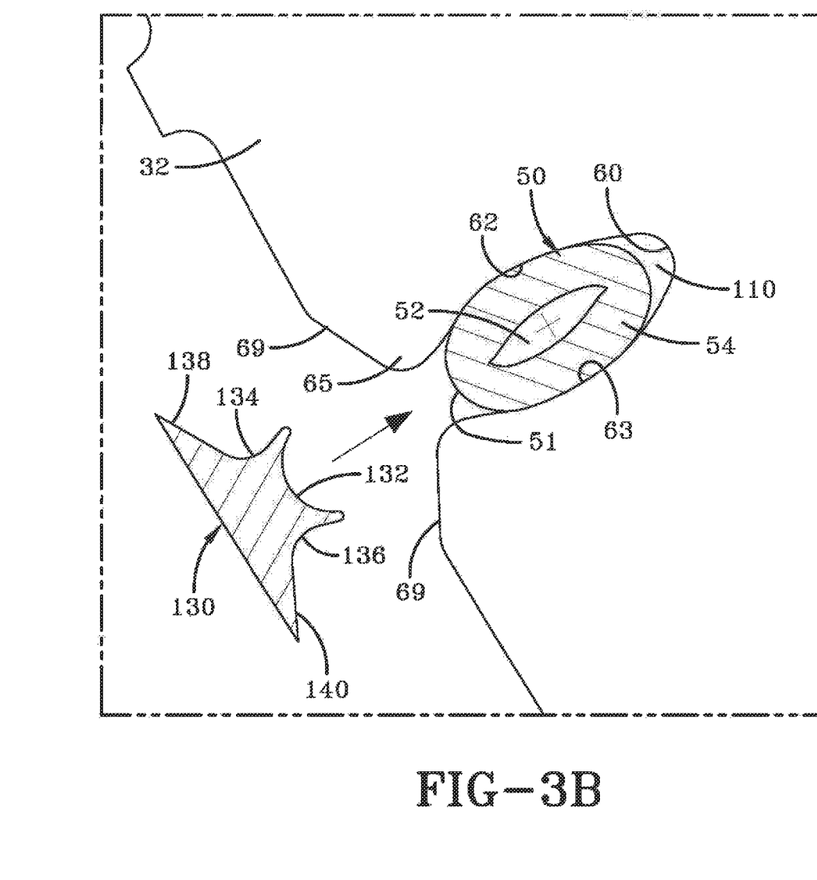
FIG. 3B illustrates a round pump tube that has been inserted in the tire of FIG. 2.
Figure 3C:
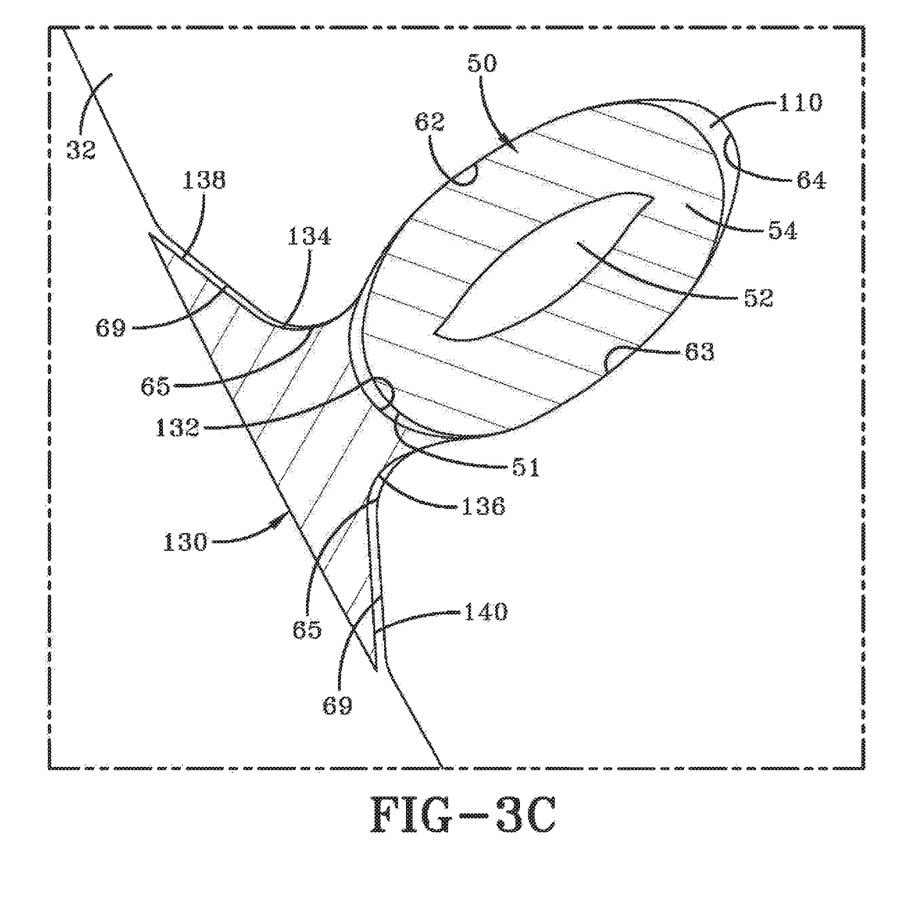
FIG. 3C illustrates a close up cross-sectional view of the end cap inserted over the opening of the round pump tube.
Figure 3D:
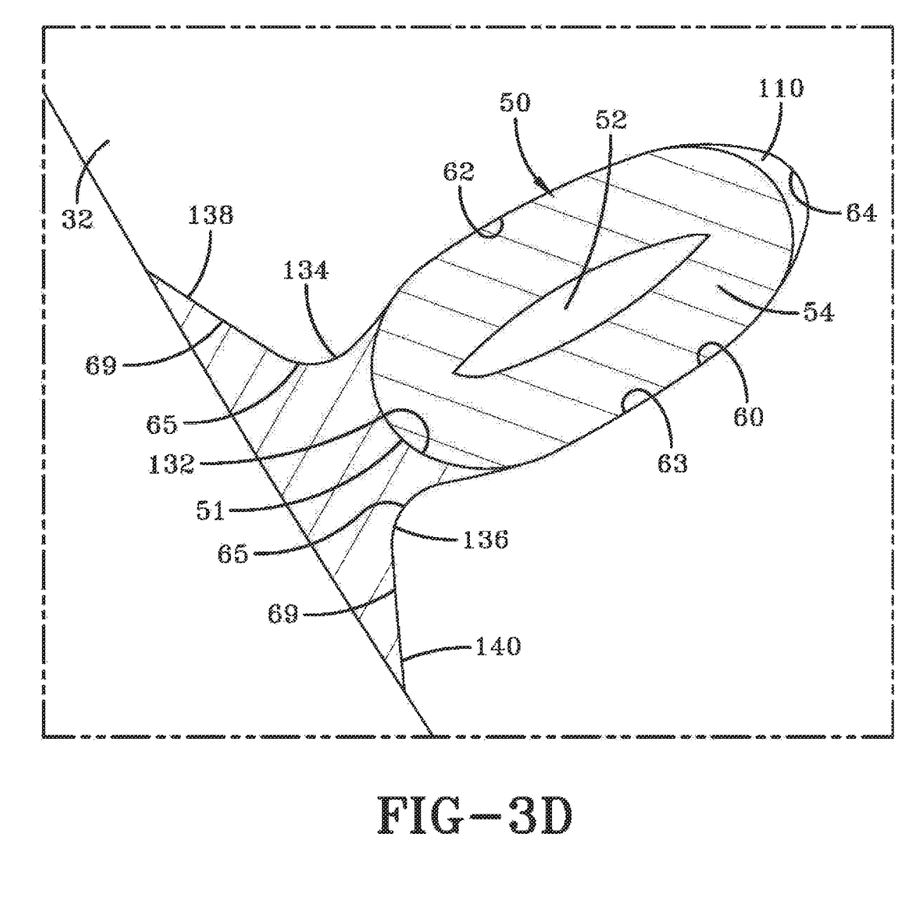
FIG. 3D illustrates a close up cross-sectional view of the pump tube after assembly into the pump sidewall passageway.

The groove 60 is shown in an unloaded state in FIG. 3A. FIG. 3A illustrates the tube in phantom positioned within the groove 60. The tube 50 has a diameter D greater than the width of the groove 60, such that there is an interference fit of the tube 50 in the width direction, when the tube 50 is mounted in the groove 60. The groove 60 has a length L that is in the range of 2 to 4 times the width W, and more preferably in the range of 3-4 times the width W. The outside diameter D of the tube 50 is preferably greater than the width W of the groove, and more preferably in the range of 1.5 to 2 times the width W of the groove. The length of the groove L is greater than the outside diameter D of the tube 50, so that when the tube is inserted in the groove 60, the tube 50 does not fill the entire groove 60 leaving a gap 110. The gap 110 allows room for filing the entire groove 60 with an adhesive to secure the tube within the groove. Thus with respect to the groove length, the tube does not have an interference fit with respect to the groove length. The groove 60 further includes a neck portion 65 with a reduced width N located at the groove inlet. The reduced width N is in the range of 40-60% of the width W. The groove 60 is defined by a first and second sidewalls 62,63, a portion of which are in parallel relation to each other. The first and second sidewalls 62,63 join together at the terminal end 64 of the groove 60.

After the tube 50 is inserted into the groove 60, a coverstrip 130 is inserted into the groove inlet to secure the tube inside the tire. The coverstrip 130 has a circular recessed face 132 that is positioned against the curved outer surface 51 of the tube 50. The coverstrip 130 has two opposed neck portions 134,136 that are received against the groove neck 65. The coverstrip 130 has outer end portions 138,140 that are mounted in the beveled portion 69 of the groove 60. FIG. 3D illustrates the tube and groove in the assembled position when the tire is in an unloaded state. When the tube is mounted into the groove, the tube cross-sectional shape is generally elliptical. FIG. 4A illustrates the groove and tube assembly when the tire is rotating under load, showing the tube in the open position. FIG. 4B illustrates when the groove and tube assembly has rotated into the footprint area, so that the tire sidewall 32 is under compression, and the tube 52 is in the closed position.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
    a tire mounted to a wheel, the tire having a tire cavity, first and second sidewalls extending respectively from first and second tire bead regions to a tire tread region;
    a groove positioned within the tire,
    a tube positioned within the groove, wherein the tube has a circular cross-sectional shape and having an outside diameter (D), and the groove does not have a circular cross-sectional shape, wherein said groove has a width (W) and a length (L), wherein the outside diameter (D) is in the range of 1.5 to 2 times the width (W) of the groove and wherein the groove length (L) is in the range of 2 to 4 times the width (W).

2. The tire assembly of claim 1, wherein the outside diameter (D) is less than the groove length (L).

3. The tire assembly of claim 1, wherein the groove is positioned in the tire sidewall.

4. The tire assembly of claim 1, wherein the tube is annular.

5. The tire assembly of claim 1, wherein the groove is annular and located proximally above an upper boundary of the rim.

6. The tire assembly of claim 1 wherein the tube cross-sectional shape is generally elliptical when mounted in the groove in the tire unloaded state.

7. The tire assembly of claim 1, wherein the groove narrows toward the groove opening.

8. The tire assembly of claim 1, wherein the groove narrows toward the groove terminal end.

9. The tire assembly of claim 1 wherein the groove length (L) is in the range of 3 to 4 times the width (W).

\* \* \* \* \*